(12) United States Patent
Messinger

(10) Patent No.: US 12,111,506 B1
(45) Date of Patent: Oct. 8, 2024

(54) SUBMARINE OCEANIC FIBER OPTIC CABLE APPARATUS FOR INCREASED DATA TRANSMISSION AND METHOD OF USE

(71) Applicant: Samuel Messinger, Ramot Bet Shemish (IL)

(72) Inventor: Samuel Messinger, Ramot Bet Shemish (IL)

(*) Notice: Subject to any disclaimer, the term of this patent is extended or adjusted under 35 U.S.C. 154(b) by 0 days.

(21) Appl. No.: 18/614,715

(22) Filed: Mar. 24, 2024

(51) Int. Cl.
*G02B 6/44* (2006.01)
*H04B 10/25* (2013.01)

(52) U.S. Cl.
CPC .......... *G02B 6/44384* (2023.05); *H04B 10/25* (2013.01)

(58) Field of Classification Search
CPC ....... G02B 6/44; G02B 6/44384; H04B 10/25
See application file for complete search history.

(56) References Cited

U.S. PATENT DOCUMENTS

| 8,340,526 | B2 | 12/2012 | Camilli et al. | |
| 9,405,084 | B2* | 8/2016 | Hurley | G02B 6/4486 |
| 9,800,344 | B2 | 10/2017 | Bjoerklund et al. | |
| 2003/0068146 | A1* | 4/2003 | Nechitailo | G02B 6/4434 |
| | | | | 385/103 |
| 2016/0365927 | A1 | 12/2016 | Bjoerklund et al. | |
| 2017/0097464 | A1* | 4/2017 | Challener | G02B 6/02366 |

OTHER PUBLICATIONS

"Submarine Cable—Focuses on Precision Manufacturing" ZTT Group—p. 1-27, downloaded Mar. 5, 2024, https://m.zttgroup.com.
"Characteristics of optical fibre submarine cables", ITU-T, G978, published Dec. 2006, pp. 1-22.
Worzyk, Thomas, "Submarine Power Cables, Design, Installation, Repair Environmental Aspects", Springer, (2009) pp. 1-306.
"Submarine Power Cables Systems, Design, Planning, and Implementation Guidelines", LS Cable America, IEEE PES NY Chapter, NYC Sep. 18, 2018, pp. 1-47.
"Undersea Telecommunication Cables: Technology Overview and Issues for Congress", Congressional Research Service report, Sep. 13, 2022, pp. 1-25.

(Continued)

*Primary Examiner* — Tina M Wong

(57) ABSTRACT

A multi-fiber-optic oceanic cable apparatus (100) with about seven times greater stiffness than normal subsea fiber-optic apparatuses, making it significantly less prone to breakage underwater. The apparatus comprises layers (from a center and outward) of: a) a hollow copper or aluminum tube (2) encircling a plurality of fiber optic cables (1) able to transmit internet data, and encased in a lubricant (3); b) a hollow polycarbonate tube (6); c) an aluminum water barrier (7); d) a plurality of polygon shaped wires (5) (e.g. hexagons) touching on all sides, and covered in a polyester film/tape (4); and e) a hollow polyethylene tube (8). The apparatus with significantly increased stiffness carries multiple internet optical fibers in parallel through the center, and additionally, within hollow polygon shaped tubes with lubricant. This increase in stiffness and/or hollow polygon tubes allows for more fiber optic cables to be bundled together, thus exponentially increasing internet flow.

20 Claims, 6 Drawing Sheets

(56) References Cited

OTHER PUBLICATIONS

Mark VanDeRee, P.E., P.Eng. and Parsons Brinckerhoff, Inc., "Submarine Cable Installation Techniques and Alternatives", Heavy Movable Structures, Inc., Fourteenth Biennial Symposium Oct. 22-25, 2012, pp. 1-20.
Samuel Messinger (inventor), "Improve Dynamic Bending Stresses in Hollow Hexagonal Stay Cables", pp. 1-3. (unpublished 2024).
Samuel Messinger (inventor), "Calculate the new increased capacity of the polygon shaped wires", pp. 1-3. (unpublished 2024).

* cited by examiner

SUBMARINE OCEANIC FIBER OPTIC CABLE APPARATUS FOR INCREASED DATA TRANSMISSION AND METHOD OF USE

FIELD OF THE INVENTION

This invention relates generally to fiber optic cables that lie within the ocean and on the ocean floor to transmit data and/or power. In particular, the present invention is a significantly more stiff and strong subsea fiber optic cable that cannot be cut into or accidentally broken, and that has the capacity to transmit exponentially more internet data than current subsea fiber optic cable systems through multiple fibers.

BACKGROUND OF THE INVENTION

Fiber optic subsea cable systems, also known as undersea cables or (suggest you use the word "submarine" a few times) subsea cables, are an essential part of the global Internet and/or power infrastructure. These cable systems or networks are used to link islands, continents, offshore platforms, underwater equipment or seismic and oceanographic survey, etc., in order to provide power and/or internet data. The term "maritime robots" is an industry term as used herein refers to the use of submarines (or similar subsea vessels) to deploy and service the cables within the ocean and upon the ocean floor.

Currently, worldwide there are over 529 cable systems and 1,444 landings that are active or under construction. For example, the 2Africa Subsea Cable System will comprise over 45,000 km of cable length running primarily around the ocean borders of Africa, thus becoming the longest fiber optic cable system ever deployed worldwide. It will connect 33 countries to deliver reliable connectivity and internet services across three continents: Africa, Asia, and Europe.

Unfortunately, current undersea fiber optic cables are prone to physical hacking (e.g. cutting into the lines) and breakage due to storms, collisions, etc., On average, in a subsea fiber optic system, every three days a fiber optic cable line breaks and subsea or maritime robotic vessels must be deployed to find and repair the break at great cost to the system owner (e.g., private companies such as Microsoft™, Facebook™, etc.). A subsea fiber optic cable can cost up to $425 a foot or over 1 billion dollars for the entire system. What is thus needed within the industry are fiber optic cables that are less prone to breakage or cutting; and/or that can carry more internet data than current subsea fiber optic cables.

SUMMARY

Various embodiments of the present invention comprise an oceanic fiber optic cable apparatus comprising one or more layers to produce an apparatus that has about seven times greater stiffness than normal fiber-optic apparatuses, making it significantly less prone to breakage underwater, and thus cheaper to maintain and operate.

In an embodiment, the oceanic fiber optic cable apparatus of the present invention comprises the layers of (from the center and outward):
  a) Layer One: a hollow copper or aluminum tube encircling a plurality of fiber optic cables able to transmit internet data, and encased in a lubricant;
  b) Layer Two: a hollow polycarbonate tube;
  c) Layer Three: an aluminum water barrier;
  d) Layer Four: a plurality of polygon shaped wires (e.g. hexagons) touching on all sides, and covered in a polyester film/tape; and
  e) Layer Five: a hollow polyethylene tube.

In an embodiment, the plurality of polygon shaped wires comprises all solid polygons, or at least one to all hollow polygons, or one-half solid and one-half hollow polygons. Types of polygons comprise, by way of non-limiting examples: triangle; quadrilateral; pentagon; hexagon; heptagon; octagon; nonagon; and decagon, or a fraction thereof. For example, hexagonal shaped steel wires can be combined with half octagonal shaped steel wires.

The subsea fiberoptic cable apparatus of the present invention is about 7 times stiffer with hexagon shaped steel wires versus prior art round wires, thus making the apparatus break less often than current oceanic cables. The hexagon wires are touching on all sides to form a cross-sectional area without gaps between the hexagons.

The stiffness of an apparatus can be adjusted by changing components (e.g. round for hexagon shaped steel wires, etc.).

In an embodiment, the apparatus carries multiple internet optical fibers in parallel through the apparatus center, and/or within at least one hollow polygon shaped steel wire while encased in lubricant. This allows for more fiber optic cables to be bundled together, thus exponentially increasing internet flow as compared to the prior art of round steel wires.

In an embodiment, the apparatus center is used to carry power lines while an outer layer of at least one hollow polygon shaped steel wire carries fiber optic cables.

In an embodiment, the apparatus comprises different combinations of polygons as sections or segments within the same apparatus (e.g. all triangular then hexagon then triangular) to create different levels of stiffness along the apparatus length. This enhances coiling or spooling the apparatus into rolls and positioning with bending on different terrain.

In an embodiment, the apparatus comprises different combination of polygon shaped steel wires cross-sectionally, while having minimal or no space between the polygons (i.e. polygons touching on all sides). For example, in a cross-sectional view, hexagons and triangular shaped steel wires are in Layer Four.

Various embodiments of the present invention comprise, an oceanic fiber optic cable apparatus comprising one or more layers of (from a center and outward):
  a. a hollow copper or aluminum tube encircling a plurality of fiber optic cables able to transmit internet data, and encased in a lubricant;
  b, wherein the plurality of fiber optic cables extend in parallel through the copper or aluminum tube, and cables are touching or non-touching; and
  c. a hollow polyester tube comprising-encasing a plurality of polygon shaped steel wires, extending in parallel and touching, wherein tube encircles tube.

In an embodiment, the lubricant comprises petroleum jelly.

In an embodiment, the oceanic fiber optic cable apparatus further comprises a hollow polycarbonate tube positioned between the hollow copper or aluminum tube and the plurality of polygon shaped steel wires.

In an embodiment, the oceanic fiber optic cable apparatus further comprises an aluminum water barrier positioned between the polycarbonate tube and the plurality of polygon shaped steel wires.

In an embodiment, the oceanic fiber optic cable apparatus further comprises an outer hollow polyethylene tube encasing the polyester tube.

In an embodiment, the oceanic fiber optic cable apparatus further comprises that the plurality of polygon shaped steel wires comprises hexagon shaped steel wires, touching on all sides to form a solid cross-sectional area.

In an embodiment, in the oceanic fiber optic cable apparatus: one-half of the polygon shaped steel wires (e.g. hexagon) are solid and one-half are hollow. In a further embodiment, at least one of the hollow further comprises fiber optic cables extending in parallel through the steel wire.

In another embodiment, all of the polygon shaped steel wires are solid.

In another embodiment, all of the steel wires are hexagon shaped hollow or solid or a combination thereof, and about seven times stiffer than prior art oceanic fiber optic cable apparatuses with round steel wires.

In another embodiment, at least one hollow polygon shaped steel wire comprises fiber optic cables, thus significantly (2-5×) increasing the amount of data transmission.

In another embodiment, the hollow polyester tube (4) comprises a BoPET (Biaxially-oriented polyethylene terephthalate), or a polyester film made from stretched polyethylene terephthalate (PET).

In another embodiment, the apparatus is further divided into segments or longitudinal sections comprising a different type or combination of types of polygons. This creates varying levels of stiffness and flexibility of the apparatus along its length.

The apparatus is deployed using maritime robots, small submarines, or similar subsea vessels to extend the internet cables between land masses, vessels, and/or platforms. For example, a method of using an oceanic fiber optic cable apparatus of the present invention comprises the steps of:
  providing an oceanic fiber optic cable apparatus comprising:
    a. a hollow copper or aluminum tube encircling a plurality of fiber optic cables able to transmit internet data, and encased in a lubricant;
    b, wherein the plurality of fiber optic cables extend in parallel through the copper or aluminum tube, and cables are touching or non-touching;
    c. a hollow polyester tube comprising-encasing a plurality of polygon shaped steel wires, extending in parallel and touching, wherein tube encircles tube;
  (optionally) attaching repeaters, amplifiers and line splitters are added to the apparatus on the ship before the apparatus is deployed into the ocean;
  attaching one end of the apparatus to a subsea vessel (e.g. stored on a reel in a ship's hull), and the opposing end to an undersea plow or robot or submarine;
  propelling the subsea vessel (plow) along an ocean floor while preventing the apparatus from being tangled or obstructed;
  (optionally) connecting the apparatus to an internet fiber-optic system existing on or near an ocean bottom; and
  testing for internet data transmission through the apparatus.

Other embodiments of the present invention are disclosed in the accompanying figures, detailed description and claims, or an obvious variation thereof.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that the same numeral in any subsequent drawing herein.

DETAILED DESCRIPTION OF INVENTION

Figure 1:
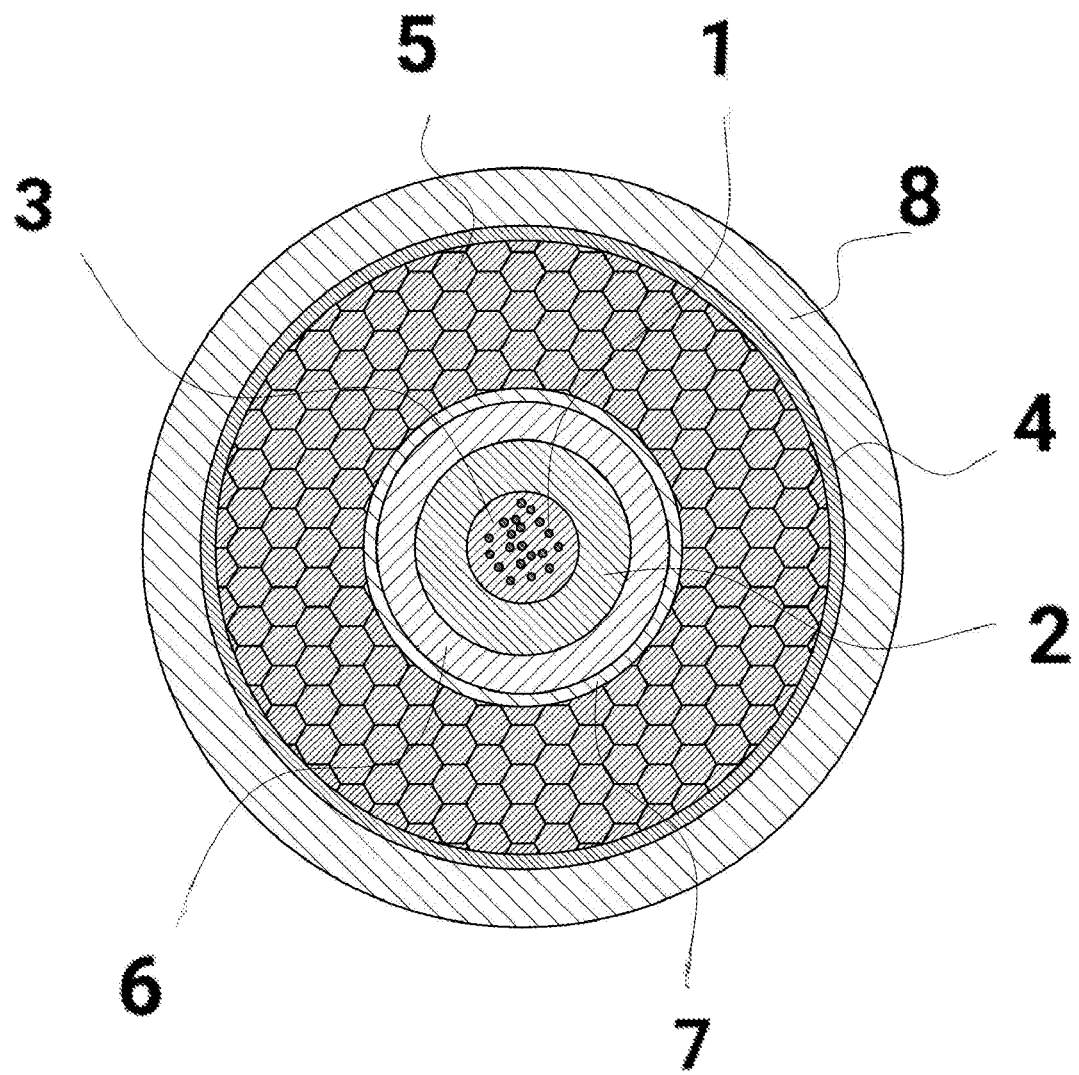
FIG. 1 illustrates an embodiment of the subsea fiberoptic cable apparatus comprising a plurality of solid hexagon shaped steel wires.

The present invention overcomes the aforesaid drawbacks of the above, and other objects, features and advantages of the present invention will now be described in greater detail. Also, the following description includes various specific details and is to be regarded as merely exemplary. Accordingly, those of ordinary skill in the art will recognize that: without departing from the scope and spirit of the present disclosure and its various embodiments there may be any number of changes and modifications described herein.

FIGS. 1-6 illustrate various embodiments of the present invention, wherein the oceanic data cable apparatus 100 comprises one or more layers encasing a plurality of fiber optic cables 1. The entire outer diameter of apparatus 100 ranges in an embodiment from about 100 millimeters to about 300 millimeters, and is largely dependent on the number of fiber optic cables 1 within apparatus 100. The length is largely dependent on location within the seawater (e.g., near surface, between relay stations, deep sea, etc.), and ranges in an embodiment, from about 20 kilometers to about 500 kilometers. Layer One: The innermost layer, or center, comprises a hollow copper or aluminum tube 2 encircling a plurality of fiber optic cables 1 able to transmit internet data, and encased in a lubricant. The copper or aluminum material functions to protect the fiber optic cables from mechanical forces (e.g. crushing).

The plurality of fiber optic cables 1 lie in parallel, touching or non-touching; and are surrounded by a semi-solid, or viscous lubricants well known in the art, such as petroleum jelly 3. The lubricant functions to keep the fiber optic cables from bunching together and to protect the cables from seawater.

Fiber optic cables 1 provide ultra-fast data transfer speeds (e.g. 4G-5G) and high bandwidth capacity, to enable rapid transmission of voice, video, and data across oceans. They can transmit massive amounts of data at the speed of light, e.g., fiber optic cables can transfer information up to 20 times faster than traditional copper cables. This results in almost real-time transmission of data between continents, with significantly reduced latency and enhanced overall network performance; without signal degradation over distance.

In alternative embodiment, Layer One comprises power lines or no lines, in lieu of fiberoptic cables 1. Instead, at least one hollow polygon shaped steel wire is within Layer Four comprises fiberoptic cables 1 (e.g. see FIG. 6).

Layer Two: Copper or aluminum tube 2 is encircled by, and in contact with, a hollow polycarbonate tube 6. Hollow refers to cross sectional areas for Layer One to fit, while tube 6 is solid along its thickness. The polycarbonate material functions to insulate and protect the fiber optic cables 1 from mechanical forces and seawater contamination.

Layer Three: The hollow polycarbonate tube 6 is encircled by an aluminum water barrier 7, which functions to protect the fiber optic cables 1 from mechanical forces and seawater contamination.

Layer Four: The aluminum water barrier 7 is encased by a plurality of polygon shaped steel wires 5 that function to stiffen the apparatus 100 and which are held in position with a polyester film 4. The stiffer the apparatus 100, then the more difficult it is to intentionally (e.g. hacking, terrorists, etc.), or accidentally (e.g., storm damage, collisions, etc.) damage the fiber optic cables 1. Wires 5 are covered in a polyester tape or film 4, such as Mylar™ tape. Mylar™, also known as BoPET (Biaxially-oriented polyethylene terephthalate), is a polyester film made from stretched polyethylene terephthalate (PET) and is used for its high tensile strength, chemical and dimensional stability, transparency, reflectivity, gas and aroma barrier properties, and electrical insulation.

In an embodiment, the shapes are hexagons, in contact on all sides to form a solid cross-sectional shape. The hexagons wires 5 can be solid cross-sectional (e.g. FIG. 1), or hollow cross-sectional (e.g. FIG. 2), or arranged with one-half solid and one-half hollow. For example, in one embodiment illustrated in FIG. 3, the solid and hollow wires are split down the middle. It is noted that other arrangements of hollow and solid wires of any polygon shape are envisioned within the scope of this invention (e.g. intermingled randomly, in a pattern, etc.).

Layer Five: The polyester tape or film 4, e.g. Mylar™ tape, is encircled by a polyethylene outer layer 8. This polyethylene layer functions to make the apparatus 100 protected from pressure and water leakage, and seawater corrosion.

Figure 5:
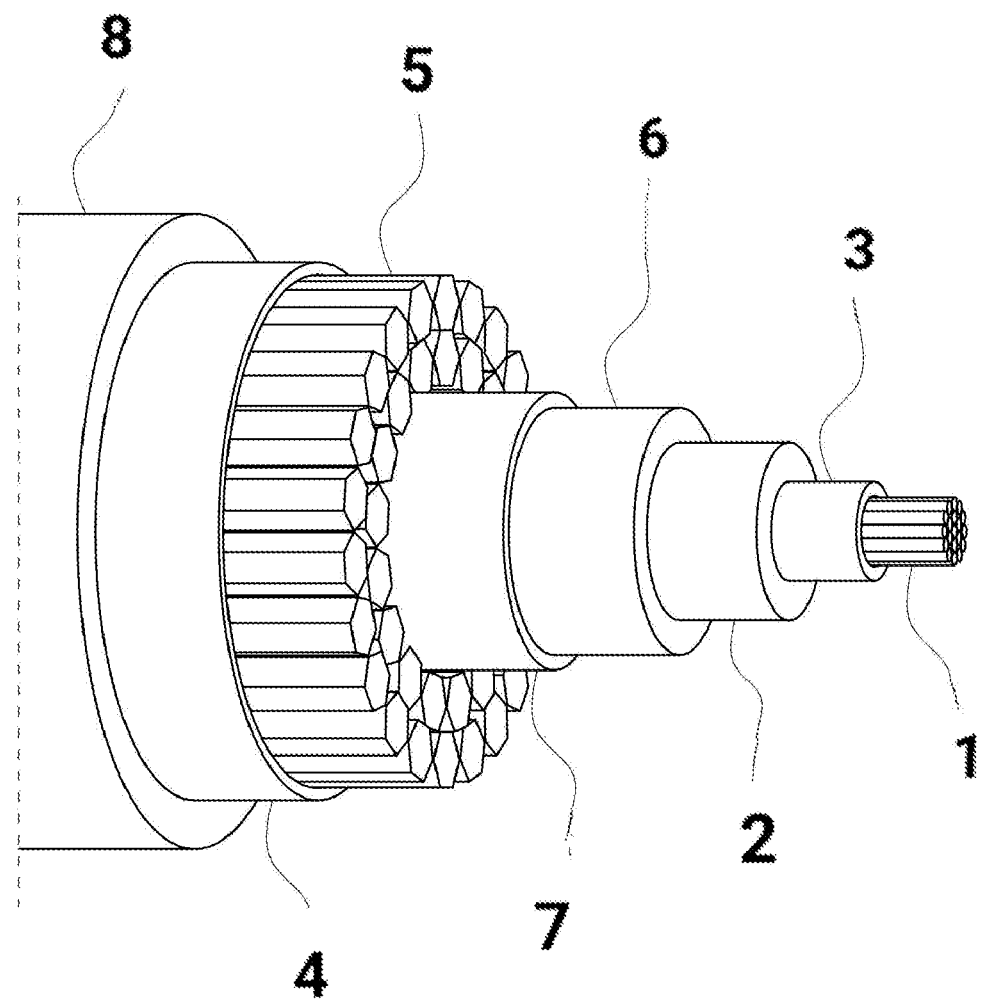
FIG. 5 illustrates a side perspective view of the subsea fiberoptic cable apparatus with a solid hexagon layer as per FIG. 1.

FIG. 5 illustrates a side perspective view of the subsea fiberoptic cable apparatus 100 with layers 1-5 (see supra). The plurality of polygons shaped wires (i.e. layer 5) are illustrated as solid cross-sectional areas. In an alternative embodiment, the plurality of polygons shaped wires comprise at least one that is hollow. In another alternative embodiment, the plurality of polygon shaped wires at least one that is hollow and houses a second bundle of fiberoptic cables 1 (in addition to Layer One-see FIG. 1). In another alternative embodiment, the plurality of polygon shaped wires at least one that is hollow and houses the only fiberoptic cables 1 (i.e. Layer One has no fiber optic cables 1).

Figure 6:
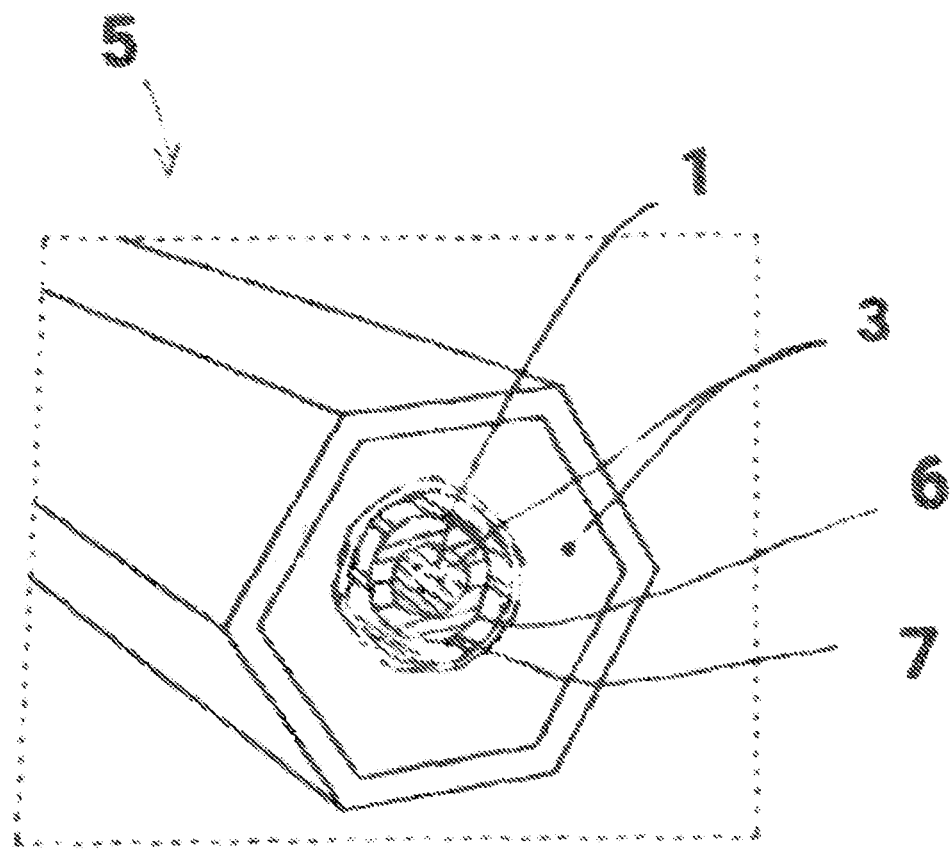
FIG. 6 illustrates a side perspective view a hollow hexagon shaped steel wire housing fiber optic cables in addition to, or in lieu of, the fiber optic cables in the center at layer one of the apparatus.

FIG. 6 illustrates a side perspective view of one exemplary hollow hexagon shaped steel wire housing fiber optic cables in addition to, or in lieu of, the fiber optic cables in the center at Layer One of apparatus 100. In the exemplified embodiment of FIG. 6, the center of the hexagon shaped steel wire comprises a plurality of fiber optic cables 1 in parallel, touching or non-touching; and surrounded by semi-solid, or viscous lubricants well known in the art, such as petroleum jelly 3. The innermost layer is surrounded by hollow polycarbonate tube 6, which is encased by an aluminum water barrier 7. The lubricant 3 then covers the remaining cross-sectional area between the aluminum water barrier 7 and the inner wall of the steel wire 5.

It is noted that other layers may be used for protecting the fiber optic cables in FIG. 6. Additionally, in an embodiment, apparatus 100 comprises all or a part of (e.g. at least one) polygon steel wire 5 housing fiber optic cables. In another embodiment, apparatus 100 comprises solid steel wires 5, or hollow steel wires 5 without fiber optic cables 1, or at least one of either.

Figure 4:
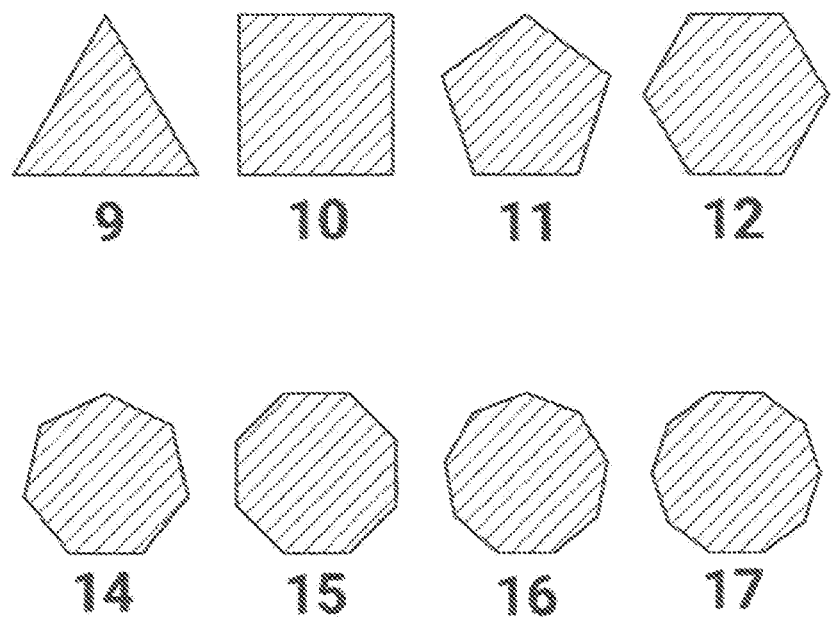
FIG. 4 illustrates different types of polygon shaped steel wires for use within the apparatus's Layer Four that are fitted together in various combinations cross-sectionally without spacing in-between, and by segments with different polygon types along the apparatus length to create different stiffness levels.

Furthermore, apparatus 100 in an embodiment is divided into segments or sections, wherein each segment comprises one of the polygons illustrated in FIG. 4 (i.e., triangle 9; quadrilateral 10; pentagon 11; hexagon 12; heptagon 14; octagon 15; nonagon 16; and decagon 17), or any combination or parts-fractions thereof (e.g. one-half). Segmentation allows apparatus 100 to vary in stiffness and flexibility so that it is able to be more easily coiled or spooled, and for deploying in different terrain subsea features (e.g. hills).

Method of Use

Figure 2:
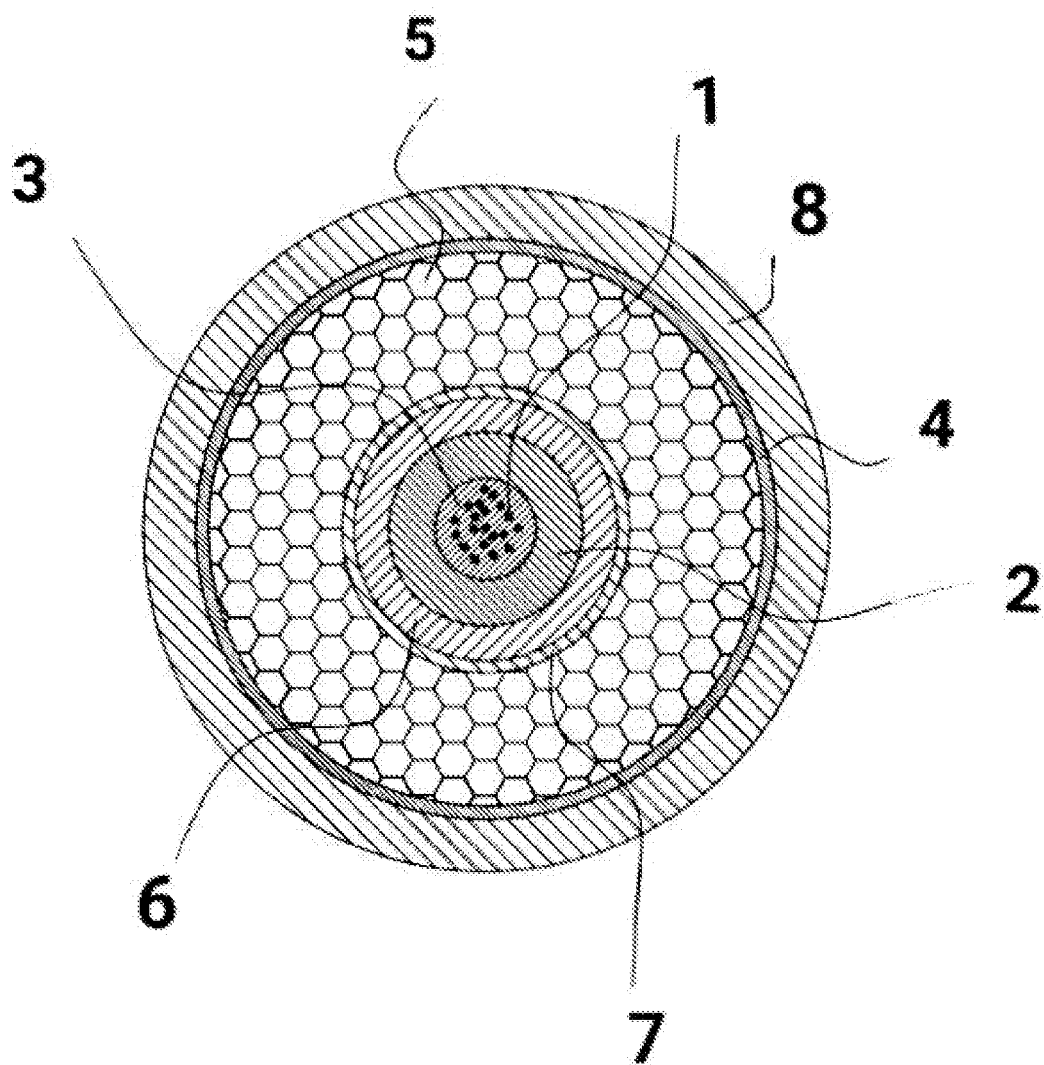
FIG. 2 illustrates an embodiment of the subsea fiberoptic cable apparatus comprising a plurality of hollow hexagon shaped steel wires.
Figure 3:
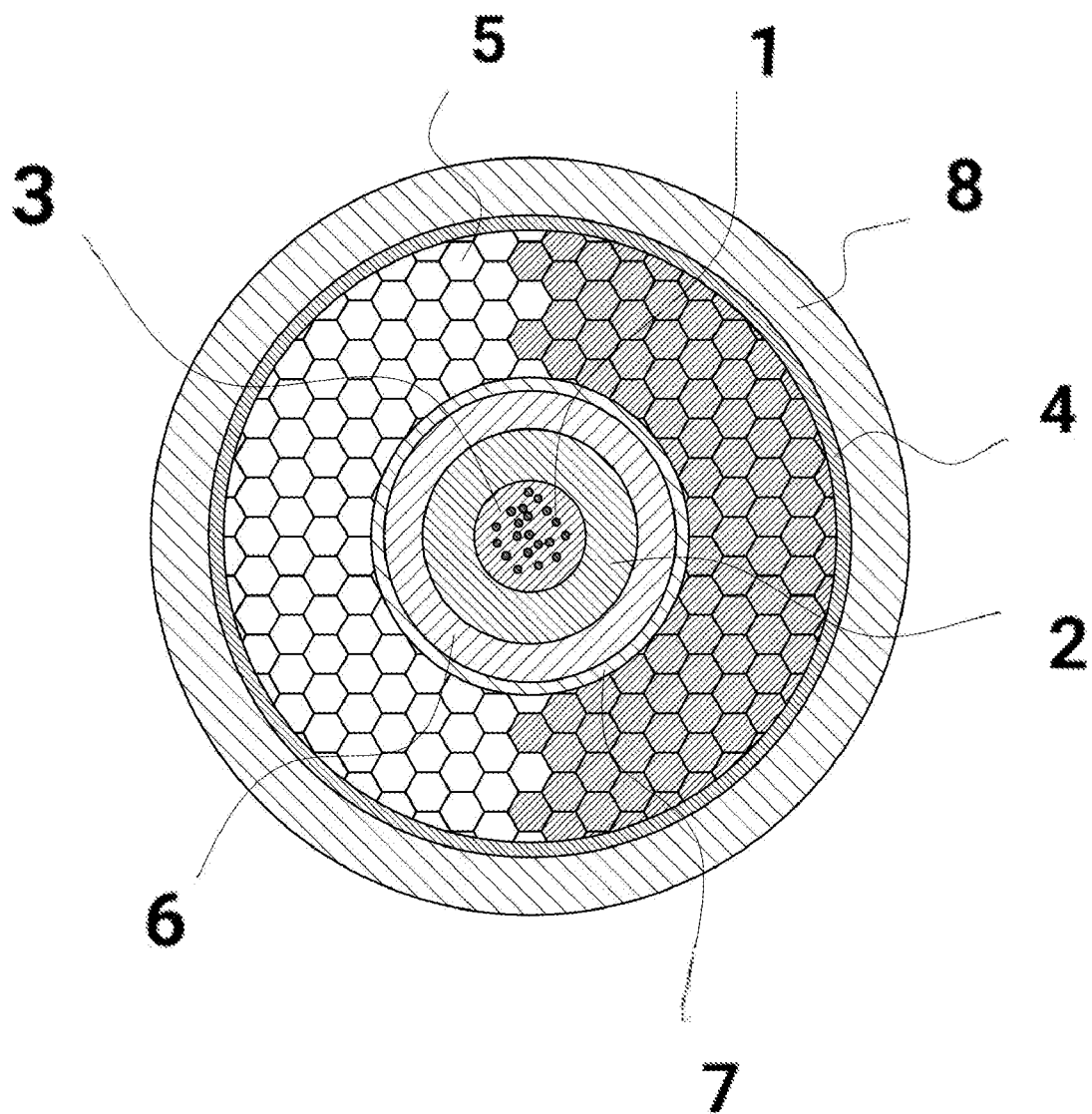
FIG. 3 illustrates an embodiment of the subsea fiberoptic cable apparatus comprising a plurality of half hollow and half solid hexagon shaped steel wires.

A method of using an oceanic fiber optic cable apparatus 100 of the present invention, comprises the following steps. Step one, an oceanic fiber optic cable apparatus 100 as disclosed herein with layers as illustrated in FIGS. 1-3 is transferred to an insulation vessel. For example, if apparatus 100 is being deployed near a shore at a shallow depth, then a ship or the a smaller vessel is used. If apparatus 100 is being deployed at an ocean depth, then a subsea vessel or maritime robot is used, which can be launched from a ocean platform or ship.

Step two comprises attaching or stabilizing one end (e.g., the spool) of apparatus 100 to the vessel or platform or landmass, and releasing the free end into the ocean. If at a deep ocean depth, apparatus 100 may lie on the ocean floor or be buried in it at a shallow depth. In more shallow areas (e.g., attaching to landmasses or platforms), apparatus 100 may be suspended within the ocean.

Step three comprises securing apparatus 100 in place, which may comprise attaching to relay stations or the other system components (e.g., see infra-Assembly 200).

Step four comprises testing the transmission of data through apparatus 100, locally and at the main substation. Areas of signal loss can be isolated and repaired by methods well known in the art.

Assembly 200

Apparatus 100 is deployed within an oceanic fiberoptic network comprising various components (e.g. an assembly) to transmit the data between landmasses and/or ocean vessels and/or ocean platforms. In an embodiment, the assembly of the present invention comprises one or more of: repeaters; wavelength division multiplexing components; advanced signal processing components; etc.

For example, in an embodiment, apparatus 100 is connected on one end, or on both ends, to repeaters able to amplify the optical signals without converting them into electrical form.

In an embodiment, apparatus 100 and/or assembly further comprises wavelength division multiplexing (WDM) technology to allow multiple signals of different wavelengths to be transmitted through a single fiber optic cable, increasing the capacity of the manifold.

In an embodiment, apparatus 100 and/or assembly further comprise advanced signal processing techniques, such as coherent detection and forward error correction, to greatly improve the signal quality and reliability in undersea communication, and to compensate for signal distortions, thus enhancing overall performance.

In an embodiment, apparatus 100 and/or assembly are cyber proof and cannot be cut (hacked) into physically underwater due to the fiber optic cables' increased stiffness.
Stiffness Apparatuses 100 of the present invention are also up to seven times stiffer and stronger than prior art cables because of the layer comprising parallel joined polygon-hexagon steel wires (layer four). Thus, apparatus 100 does not require frequent repair on the ocean floor for breakage or leaks. The stiffness level can be adjusted by changing the type of polygons (e.g., see Experiment infra).

Due to this significantly increased stiffness, apparatus 100 is cyber-proof and cannot be cut (hacked) into physically underwater, or damaged during storms.
Experiment The purpose of the experiments-calculations herein is to explore the concept of enhancing the load-bearing capacity of oceanic data cables by using polygon-shaped wires. Three polygon shapes: round, pentagon, and hexagon, are used to calculate the surface area contact for each shape.

Methods are used to determine the amount of increased capacity based on the increased surface area contact. The load-bearing capacity of a cable is a crucial factor in various applications. By changing the shape of the wires from round to polygons, the surface area contact between the wires is increased, thus enhancing the cable's load-bearing capacity. This experiment calculates the increased capacity for polygon-shaped wires and compares different polygon shapes.

For a round shaped cable, the surface area is given by (where D is the diameter of the cable):

Surface Area=$\pi*(D/2)^2$

For a polygon shaped cable, the surface area is calculated as the follows, where the perimeter is the sum of the lengths of the sides, and the apothem is the distance from the center to the midpoint of a side.

Surface Area=$\frac{1}{2}$*Perimeter*Apothem

The apothem of a regular polygon is calculated as follows, where "n" is the number of sides of the polygon and side is the length of the longest edge of the polygon:

Apothem=Side/$(2*\tan(\pi/n))$

Example calculations:

Diameter $(D)$=5.067*10$^{-10}$ meters

Number of Strands (N)=10

Round shaped wire strands within cable:

Radius=$D/2$=(5.067*10$^{-10}$)/2=2.534*10$^{-10}$ meters

Surface Area=$\pi(2.534*10^{-10})^2$=2.020*10$^{-19}$ meters$^2$

Total surface area for 10 round strands=10*2.020*10$^{-19}$ m$^2$=2.020*10$^{-18}$ m$^2$ Pentagon shaped wire strands within cable:

Perimeter=5*Side

Apothem=1 m/(2 tan($\pi$/5))

Example of 1 meter side length:

Perimeter=5*1 m=5 m

Apothem=1 m/(2 tan($\pi$/5))=0.688 m

Surface Area=$\frac{1}{2}$*(5 m)*(0.688 m)=1.720 m$^2$

Total surface area for 10 round strands=10*1.720 m$^2$=17.20 m$^2$

Hexagon shaped wire strands within cable:

Perimeter=6*Side

Apothem=Side/(2 tan($\pi$/6))

Example of 1 meter side length:

Perimeter=6*1 m=6 m

Apothem=1 m/(2 tan($\pi$/6))=0.577 m

Surface Area=$\frac{1}{2}$*(6 m)*(0.577 m)=1.732 m$^2$

Total surface area for 10 round strands=10*1.732 m$^2$=17.32 m$^2$

Based on the calculations, it is shown in Table 1 that the hexagon shaped wire layer within a oceanic underwater cable will provide the highest surface area. Therefore, using hexagonal-shaped wires in the cable would result in the greatest increase in load-bearing capacity compared to round or pentagonal wire strands, for any specified diameter and number of strands.

TABLE 1

Increase in Strength for Different Strand Shapes

| Strand Shape | Surface Area Contact (m$^2$) | Increase in Strength (%) |
| --- | --- | --- |
| Circular | 2.020 10$^{i18}$ | 0% |
| Pentagon | 17.20 | 750% |
| Hexagon | 17.32 | 760% |

Conclusion:

This disclosure fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Or, the technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 5%), As used herein, the term "substantially" refers to approximately the same shape as stated.

As used herein, the term "hollow tube" refers to the tube not being solid tube material across the cross-sectional area; but, rather having space within the tube walls to house other apparatus components (e.g. wires, fiberoptic cables, etc.).

While several embodiments of the disclosure have been described, it is not intended that the disclosure be limited thereto, as it is intended that the disclosure be as broad in scope as the art will allow and that the specification be read likewise. Therefore, the above description should not be construed as limiting, but merely as exemplifications of embodiments.

Trademarks: the product names used in this document are for identification purposes only; and are the property of their respective owners.

What is claimed is:

1. An oceanic fiber optic cable apparatus (100) comprising one or more layers of (from a center and outward):
   a. a hollow copper or aluminum tube (2) encircling a plurality of fiber optic cables (1) able to transmit internet data, and encased in a lubricant (3);
   b, wherein the plurality of fiber optic cables (1) extend in parallel through the copper or aluminum tube (2), and the plurality of fiber optic cables (1) are touching or non-touching, and hollow or solid or a combination thereof; and
   c. a hollow polyester tube or tape (4) encasing a plurality of polygon shaped steel wires (5), said wires extending in parallel and touching, wherein the hollow polyester tube or tape (4) encircles the hollow copper or aluminum tube (2).

2. The oceanic fiber optic cable apparatus of claim 1, wherein lubricant (3) comprises petroleum jelly.

3. The oceanic fiber optic cable apparatus of claim 1, further comprising a hollow polycarbonate tube (6) positioned between the hollow copper or aluminum tube (2) and the plurality of polygon shaped steel wires (5).

4. The oceanic fiber optic cable apparatus of claim 3, further comprising an aluminum water barrier (7) positioned between the polycarbonate tube (6) and the plurality of polygon shaped steel wires (5).

5. The oceanic fiber optic cable apparatus of claim 1, further comprising an outer hollow polyethylene tube encasing the polyester tube or tape (4).

6. The oceanic fiber optic cable apparatus of claim 1, wherein the plurality of polygon shaped steel wires (5) comprises: triangle; quadrilateral; pentagon; hexagon; heptagon; octagon; nonagon; and decagon, or any combination thereof, or any fraction thereof.

7. The oceanic fiber optic cable apparatus of claim 6, wherein the plurality of polygon shaped steel wires (5) comprise hexagon shaped steel wires, touching on all sides to form a cross-sectional area without gaps in-between the steel wires.

8. The oceanic fiber optic cable apparatus of claim 1, wherein at least one of the plurality of polygon shaped steel wires is solid and at least one is hollow.

9. The oceanic fiber optic cable apparatus of claim 1, wherein all of the plurality of polygon shaped steel wires (5) are solid.

10. The oceanic fiber optic cable apparatus of claim 1, wherein at least one of the polygon shaped steel wires is hollow and further comprises a plurality of fiber optic cables (1) housed within.

11. The oceanic fiber optic cable apparatus of claim 7, wherein the apparatus comprising hexagon shaped steel wires is about 760% stronger than an oceanic fiber optic cable apparatus comprising a plurality of round steel wires.

12. The oceanic fiber optic cable apparatus of claim 1, wherein said apparatus comprises hollow steel wires housing additional fiber optic cables and is able to transmit more internet data as compared to apparatus's comprising solid round steel wires.

13. The oceanic fiber optic cable apparatus of claim 1, wherein the hollow polyester tube (4) comprises a BoPET (Biaxially-oriented polyethylene terephthalate), or a polyester film made from stretched polyethylene terephthalate (PET).

14. The oceanic fiber optic cable apparatus of claim 1, further comprising the apparatus divided into segments, each segment comprising a different type the plurality of polygon shaped steel wires to create a different level of stiffness along an apparatus length.

15. A method of using an oceanic fiber optic cable apparatus, comprising the steps of:
    providing an oceanic fiber optic cable apparatus (100) comprising:
      a. a hollow copper or aluminum tube (2) encircling a plurality of fiber optic cables (1) able to transmit internet data, and encased in a lubricant (3);
      b. wherein the plurality of fiber optic cables (1) extend in parallel through the copper or aluminum tube (2), and the plurality of fiber optic cables (1) are touching or non-touching, and hollow or solid or a combination thereof;
      c. a hollow polyester tube or tape (4) encasing a plurality of polygon shaped steel wires (5), said wires extending in parallel and touching, wherein the hollow polyester tube or tape (4) encircles the hollow copper or aluminum tube (2);
    attaching one end of apparatus (100) to a subsea vessel, and the opposing end to a fixed landmass or ocean platform;
    propelling the subsea vessel to an ocean floor while preventing apparatus (100) from being tangled or obstructed;
    connecting apparatus (100) to an internet fiber-optic system existing on or near an ocean bottom; and
    testing for internet data transmission through apparatus 100.

16. The oceanic fiber optic cable apparatus of claim 15, wherein lubricant (3) comprises petroleum jelly.

17. The oceanic fiber optic cable apparatus of claim 15, further comprising a hollow polycarbonate tube (6) positioned between the hollow copper or aluminum tube (2) and the plurality of polygon shaped steel wires (5).

18. The oceanic fiber optic cable apparatus of claim 17, further comprising an aluminum water barrier (7) positioned between the polycarbonate tube (6) and the plurality of polygon shaped steel wires (5).

19. The oceanic fiber optic cable apparatus of claim 15, further comprising an outer hollow polyethylene tube encasing the polyester tube or tape (4).

20. The oceanic fiber optic cable apparatus of claim 15, wherein the plurality of polygon shaped steel wires (5) comprise: triangle; quadrilateral; pentagon; hexagon; heptagon; octagon; nonagon; and decagon, or any combination thereof.

* * * * *